United States Patent
Covington et al.

(10) Patent No.: US 12,253,133 B2
(45) Date of Patent: Mar. 18, 2025

(54) CLUTCH ASSEMBLY INCLUDING WET FRICTION MATERIAL WITH CALCINED KAOLIN CLAY AND TUNG MODIFIED PHENOLIC RESIN

(71) Applicant: Schaeffler Technologies AG & Co. KG, Herzogenaurach (DE)

(72) Inventors: Kayla Covington, Dalton, OH (US);
Rashid Farahati, Copley, OH (US);
Murat Bakan, Canton, OH (US);
Michael Yanetta, Valley City, OH (US)

(*) Notice: Subject to any disclaimer, the term of this patent is extended or adjusted under 35 U.S.C. 154(b) by 438 days.

(21) Appl. No.: 17/567,394

(22) Filed: Jan. 3, 2022

(65) Prior Publication Data
US 2023/0213078 A1 Jul. 6, 2023

(51) Int. Cl.
*F16D 69/02* (2006.01)
*F16D 13/64* (2006.01)
*F16D 13/72* (2006.01)
*F16D 13/74* (2006.01)

(52) U.S. Cl.
CPC ............ *F16D 69/026* (2013.01); *F16D 13/64* (2013.01); *F16D 13/72* (2013.01); *F16D 13/74* (2013.01); *F16D 2200/006* (2013.01)

(58) Field of Classification Search
CPC .. F16D 69/026; F16D 13/64; F16D 2200/006; D04H 1/413; D04H 1/58; D04H 1/587; D04H 1/593; D04H 1/60; D04H 1/62; D04H 1/64; D04H 1/641; D04H 1/642; D04H 1/643; D04H 1/645; D04H 1/65; D04H 1/655; D04H 1/66; D04H 1/68; D04H 3/12
See application file for complete search history.

(56) References Cited

U.S. PATENT DOCUMENTS

| | | |
|---|---|---|
| 5,453,317 A | 9/1995 | Yesnik |
| 6,182,804 B1 | 2/2001 | Lam |
| 7,740,698 B2 | 6/2010 | Kitami et al. |
| 10,302,165 B2 | 5/2019 | Kikudome et al. |
| 10,633,799 B2 | 4/2020 | Tilton et al. |
| 2005/0039872 A1 | 2/2005 | Kimura et al. |
| 2006/0009566 A1 | 1/2006 | Jones et al. |

(Continued)

FOREIGN PATENT DOCUMENTS

| | | |
|---|---|---|
| ES | 2585882 T3 | 10/2016 |
| JP | 2020002318 A | 1/2020 |

(Continued)

OTHER PUBLICATIONS

International Search Report and Written Opinion for PCT/US2022/052211, which claims priority of the present application.

*Primary Examiner* — Larissa Rowe Emrich

(57) ABSTRACT

A clutch assembly for a motor vehicle drivetrain includes a rigid support and a wet friction material fixed to a surface of the rigid support. The wet friction material includes a base material including a matrix of fibers and filler particles embedded in the matrix of fibers. The filler particles include calcined kaolin clay, and the base material includes, by percent weight, 5 to 60% of calcined kaolin clay. The wet friction material also includes a binder embedded in the base material. The binder is tung modified phenolic resin.

13 Claims, 4 Drawing Sheets

(56) References Cited

U.S. PATENT DOCUMENTS

2006/0241207 A1\* 10/2006 Lam ..................... D06M 11/79
                                                                  523/149
2017/0261057 A1    9/2017   Farahati et al.
2018/0149222 A1\*   5/2018   Farahati ................ F16D 69/026

FOREIGN PATENT DOCUMENTS

KR           101073630 B1    4/2005
KR     1020160131013 A    11/2016

\* cited by examiner

CLUTCH ASSEMBLY INCLUDING WET FRICTION MATERIAL WITH CALCINED KAOLIN CLAY AND TUNG MODIFIED PHENOLIC RESIN

The present disclosure relates generally to friction clutches and plates used in torque converters and other motor vehicle drivetrain components and more specifically to a clutch assembly including a wet friction material.

BACKGROUND

U.S. Pub. No. 2018/0149222 A1 discloses a wet friction material that includes aluminum silicate in the form of calcined kaolin clay. This wet friction material achieved a static friction coefficient of 0.13, and dynamic friction coefficients below 0.175.

SUMMARY

A clutch assembly for a motor vehicle drivetrain is provided. The clutch assembly includes a rigid support and a wet friction material fixed to a surface of the rigid support. The wet friction material includes a base material including a matrix of fibers and filler particles embedded in the matrix of fibers. The filler particles include calcined kaolin clay, and the base material includes, by percent weight, 5 to 60% of calcined kaolin clay. The wet friction material also includes a binder embedded in the base material. The binder is tung modified phenolic resin.

A method of making a clutch assembly for a motor vehicle is also provided. The method includes fixing a wet friction material to a surface of a rigid support. The wet friction material is made by providing a base material including a matrix of fibers and filler particles including calcined kaolin clay embedded in the matrix of fibers, saturating the base material with tung modified phenolic resin and curing the tung modified phenolic resin.

A wet friction material is also provided that includes a base material including a matrix of fibers and filler particles embedded in the matrix of fibers, the filler particles including calcined kaolin clay, the based material including, by percent weight, 5 to 60% of calcined kaolin clay; and a binder embedded in the base material, the binder being tung modified phenolic resin.

BRIEF DESCRIPTION OF THE DRAWINGS

The present disclosure is described below by reference to the following drawings, in which.

DETAILED DESCRIPTION

Next generation wet friction materials for electric and hybrid applications need to provide higher torque which requires a higher friction coefficient. To achieve this the friction material will need to reach and maintain the desired friction coefficient.

The present disclosure provides a friction material with cellulose fibers, calcined kaolin clay, graphite, and diatomaceous earth saturated in tung modified phenolic resin that achieves higher friction coefficients. The inventors discovered that while friction materials including tung oil usually had acceptable durability but insufficient friction performance, adding clay to friction materials with tung oil surprisingly result in a friction material with a higher friction coefficient that may be useful for in drive trains of electric and hybrid vehicles. The inventors discovered that using the calcined kaolin and the tung modified phenolic resin together has a synergistic effect of increasing both the dynamic and static friction coefficients.

The graphite and diatomaceous earth aid in durability and friction stability. Exemplary formulations showed a 5-40% increase in friction coefficient compared to the friction material disclosed in U.S. Pub. No. 2018/0149222 A1.

Figure 1:
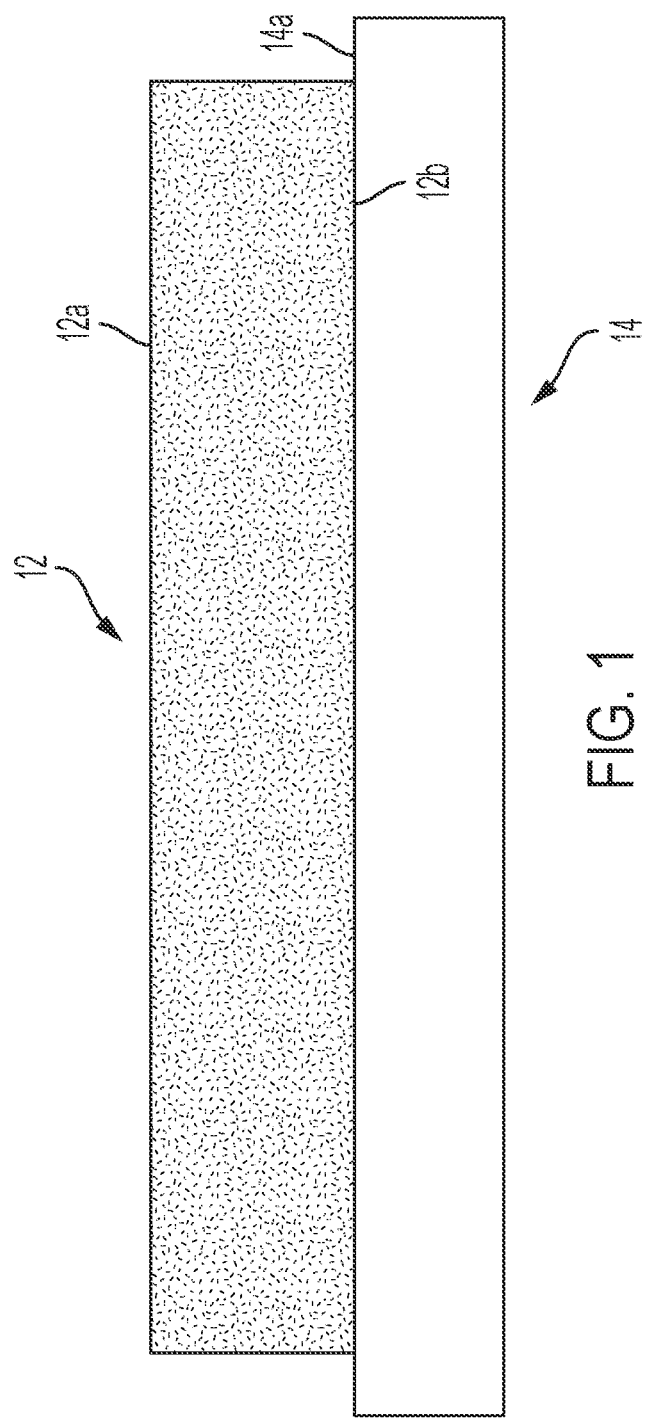
FIG. 1 schematically shows a clutch assembly including a wet friction material layer in accordance with an embodiment of the present disclosure joined on top of a metal part via a heat plate.

FIG. 1 schematically illustrates a wet friction material layer in accordance with an embodiment of the present disclosure in a clutch assembly.

A wet friction material layer 12 may be formed of fibers, filler material and a binder. The fibers may be cellulose fibers. The filler material may be particles of both diatomaceous earth and calcined kaolin clay. The binder may be a tung modified phenolic resin. A friction modifier in the form of graphite may also be included in wet friction material layer 12.

In one preferred embodiment, wet friction material layer 12 may include, before being saturated by tung modified phenolic resin, by percentage weight, 20-60% fibers, which in one example are advantageously cellulose, 5-60% calcined kaolin clay, 1-20% graphite, 5-40% diatomaceous earth. The tung modified phenolic resin is added on in weight percent that is 31-35% of the weight of the resulting friction material. Thus, the dried and cured friction material would be 13-41% cellulose, 3-41% calcined kaolin clay, 1-14% graphite, 3-21% diatomaceous earth, and 31-35% tung modified phenolic resin.

In a further preferred embodiment, wet friction material layer 12 may include, before being saturated by tung modified phenolic resin, by percentage weight, 30-60% fibers, which in one example are advantageously cellulose, 10-40% calcined kaolin clay, 5-20% graphite, 10-40% diatomaceous earth. The tung modified phenolic resin is added on in weight percent that is 31-35% of the weight of the resulting friction material. Thus, the dried and cured friction material would be 20-41% cellulose, 7-28% calcined kaolin clay, 3-14% graphite, 7-21% diatomaceous earth, and 31-35% tung modified phenolic resin.

In a further preferred embodiment, wet friction material layer 12 may include, before being saturated by tung modified phenolic resin, by percentage weight, 45-55% fibers, which in one example are advantageously cellulose, 15-25% calcined kaolin clay, 5-15% graphite, 25-35% diatomaceous earth. The tung modified phenolic resin is added on in weight percent that is 31-35% of the weight of the resulting friction material. Thus, the dried and cured friction material would be 29-38% cellulose, 10-17% calcined kaolin clay, 3-10% graphite, 16-24% diatomaceous earth, and 31-35% tung modified phenolic resin.

In each of the above-mentioned embodiments, the calcined kaolin clay, graphite and diatomaceous earth may advantageously form 45-55%, by percentage weight, of the wet frictional material layer before being saturated by tung modified phenolic resin.

As disclosed in U.S. Pub. No. 2018/0149222 A1, the calcined kaolin clay has the chemical formulation of $MAl_2O_3NSiO_2$, wherein M and N are integers. The exact values for M and N depend on a number of factors including the source of the raw material for the kaolin clay. In an example embodiment, the chemical composition of the calcined kaolin clay may be represented at having an alumina content of at least 35 wt % and at most 55 wt % and a silica content of at least 45 wt % and at most 65 wt %.

The calcined kaolin clay may advantageously have particle sizes 0.5 to 2 microns.

The tung modified phenolic resin may advantageously have a solid percent of 30-60%, a viscosity of 200-600 cps and a pH of 6-9.

The fibers of layer 12 may have a length of 0.5-3.0 mm, a diameter of 5-25 micron.

The graphite may have a surface area of 6.35 $m^2/g$.

Wet friction material layer 12 is placed on top of a metal part 14 and layer 12 and part 14 are joined together to form a friction assembly. Prior to joining of layer and part 14, the binder is subject to initial curing to a level called B-stage, where the layer 12 is somewhat flexible. The joining of layer 12 and part 14 together includes pressing wet friction material layer 12 against metal part 14 with a heat plate to complete curing of the binder in wet friction material layer 12, fixing wet friction material layer 12 and metal part 14 together. The force of pressing of heat plate against outer surface 12a of wet friction material layer 12, while inner surface 12b of wet friction material layer 12 rests on an outer layer 14a of metal part 14, causes the binder to accumulate at an interface of inner surface 12b of wet friction material layer 12 and outer surface 14a of metal part 14, while the curing of the binder by the heat of heat plate creates a permanent connection between metal part 14 and wet friction material layer 12. The binder solidifies and hardens in wet friction material layer 12 in contact with filler and fibers. In one preferred embodiment, the heat at a surface of plate that contacts outer surface 12a of outer layer is 375 to 425 degrees F.

Figure 2:
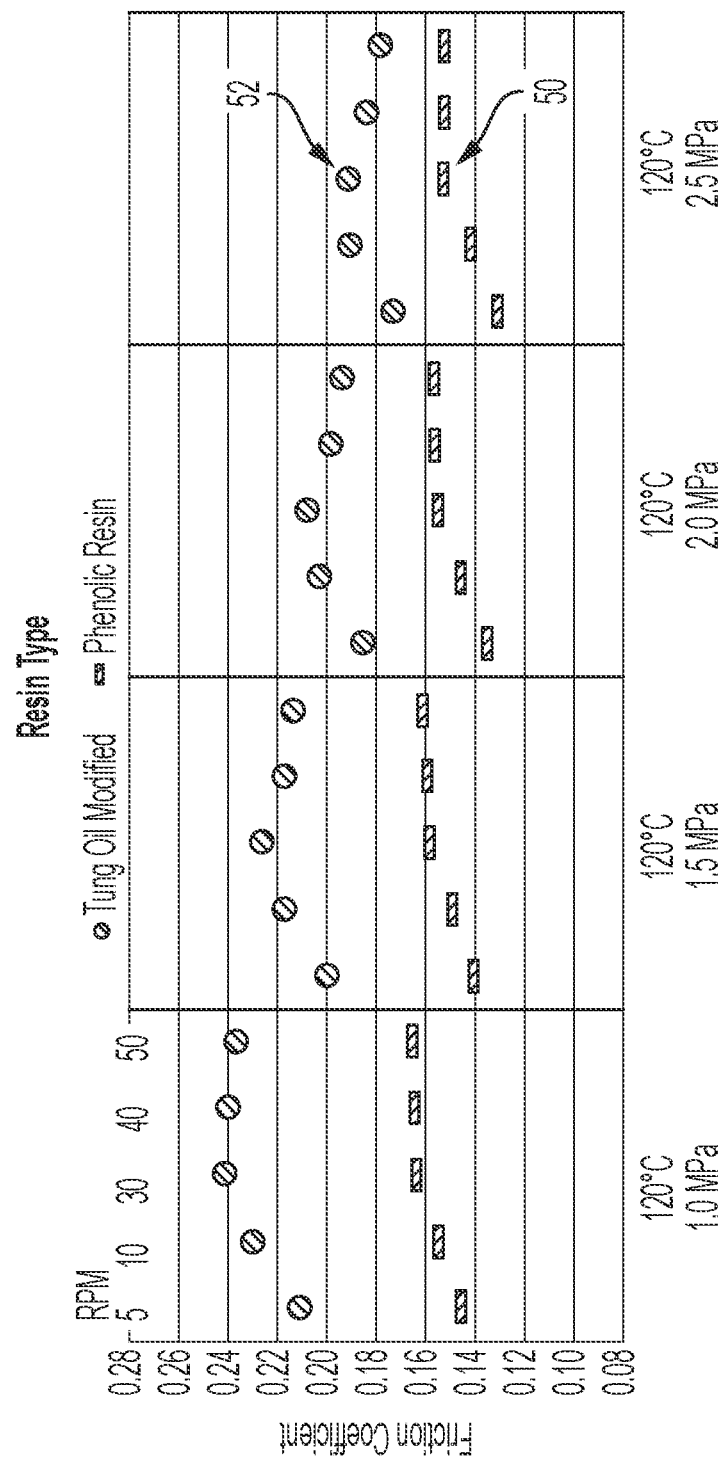
FIG. 2 shows a friction versus speed graph illustrating a friction material including calcined kaolin clay with a standard phenolic resin and a friction material including calcined kaolin clay with a tung modified phenolic resin.

FIG. 2 shows a friction versus speed graph illustrating a friction material 50 (illustrated by dashes) including calcined kaolin clay with a standard phenolic resin and a friction material 52 (illustrated by circles) including calcined kaolin clay with a tung modified phenolic resin at different pressures. Both of the examples in FIG. 2 consist of a material matrix that is, by weight percentage, 50% cellulose fiber, 30% diatomaceous earth and 20% calcined kaolin clay, with the phenolic resin being added on in weight percent that is 33% of the of the weight of the material matrix. Thus, the dried friction material includes, by weight percentage, 34% cellulose fiber, 20% diatomaceous earth, 13% calcined kaolin clay and 33% phenolic resin.

As shown in FIG. 2, friction material 52 has a surprisingly greater dynamic friction coefficient than friction material 50 over a variety of speed ranges, solely due to tung modified phenolic resin being used with calcined kaolin clay instead of standard phenolic resin, across a number of different speeds and application pressures. All of the tests were performed using FORD ultra low viscosity (ULV) automatic transmission fluid, which has a viscosity of 19.2 cSt at 40° C. and 4.5 cSt at 100° C., having a temperature of 120° C. for the results shown below in Table 1, which are illustrated in FIG. 2.

| Tung Modified Phenolic Resin | | | Standard Modified Phenolic Resin | | |
|---|---|---|---|---|---|
| Applied Pressure | Rotational Speed | Friction Coefficient | Applied Pressure | Rotational Speed | Friction Coefficient |
| 1.0 | 5 | 0.21 | 1.0 | 5 | 0.15 |
|  | 10 | 0.23 |  | 10 | 0.16 |
|  | 30 | 0.24 |  | 30 | 0.16 |
|  | 40 | 0.24 |  | 40 | 0.17 |
|  | 50 | 0.24 |  | 50 | 0.17 |
| 1.5 | 5 | 0.20 | 1.5 | 5 | 0.14 |
|  | 10 | 0.22 |  | 10 | 0.15 |
|  | 30 | 0.23 |  | 30 | 0.16 |
|  | 40 | 0.22 |  | 40 | 0.16 |
|  | 50 | 0.21 |  | 50 | 0.16 |
| 2.0 | 5 | 0.19 | 2.0 | 5 | 0.14 |
|  | 10 | 0.20 |  | 10 | 0.15 |
|  | 30 | 0.21 |  | 30 | 0.16 |
|  | 40 | 0.20 |  | 40 | 0.16 |
|  | 50 | 0.19 |  | 50 | 0.16 |
| 2.5 | 5 | 0.17 | 2.5 | 5 | 0.13 |
|  | 10 | 0.19 |  | 10 | 0.14 |
|  | 30 | 0.19 |  | 30 | 0.15 |
|  | 40 | 0.19 |  | 40 | 0.15 |
|  | 50 | 0.18 |  | 50 | 0.15 |

Accordingly, FIG. 2 shows that for a range of 5 RPM to 50 RPM and a range of 1.0 MPa to 2.5 MPa, the friction material 52 including calcined kaolin clay with a tung modified phenolic resin surprisingly performs substantially better than the friction material 50 including calcined kaolin clay with a standard phenolic resin. In particular, the friction material 50 has a frictional coefficient range of 0.17 to 0.24 for a range of 5 RPM to 50 RPM and a range of 1.0 MPa to 2.5 MPa. In contrast, friction material 52 has a frictional coefficient range of 0.13 to 0.17 for a range of 5 RPM to 50 RPM and a range of 1.0 MPa to 2.5 MPa.

With an applied pressure of 1.0 MPa, the friction material 52 has a frictional coefficient range of 0.21 to 0.24 for a range of 5 RPM to 50 RPM.

With an applied pressure of 1.5 MPa, the friction material 52 has a frictional coefficient range of 0.20 to 0.23 for a range of 5 RPM to 50 RPM.

With an applied pressure of 2.0 MPa, the friction material 52 has a frictional coefficient range of 0.19 to 0.21 for a range of 5 RPM to 50 RPM.

With an applied pressure of 2.5 MPa, the friction material 52 has a frictional coefficient range of 0.17 to 0.19 for a range of 5 RPM to 50 RPM.

With a rotational speed of 5 RPM, the friction material 52 has a frictional coefficient range of 0.17 to 0.21 for a range of 1.0 MPa to 2.5 MPa.

With a rotational speed of 10 RPM, the friction material 52 has a frictional coefficient range of 0.19 to 0.23 for a range of 1.0 MPa to 2.5 MPa.

With a rotational speed of 30 RPM, the friction material 52 has a frictional coefficient range of 0.19 to 0.24 for a range of 1.0 MPa to 2.5 MPa.

With a rotational speed of 40 RPM, the friction material 52 has a frictional coefficient range of 0.19 to 0.24 for a range of 1.0 MPa to 2.5 MPa.

With a rotational speed of 50 RPM, the friction material 52 has a frictional coefficient range of 0.18 to 0.24 for a range of 1.0 MPa to 2.5 MPa.

It is notable that for applied pressures of 1.0 to 1.5 MPa, the friction material 52 has a frictional coefficient range of 0.20 to 0.24 for a range of 5 RPM to 50 RPM.

Figure 3:
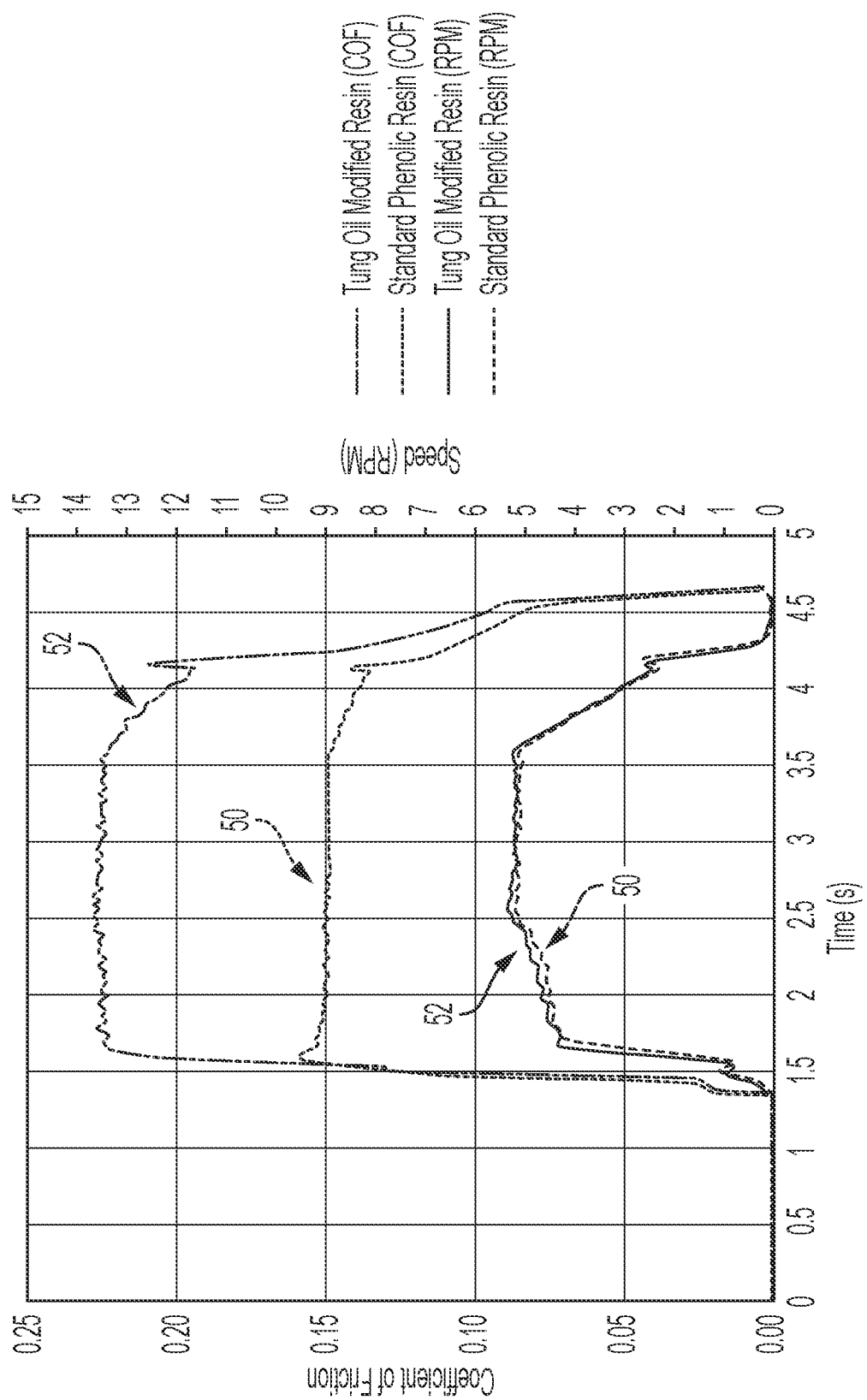
FIG. 3 shows a graph of test that show static friction coefficients reached by the friction material including calcined kaolin clay with a standard phenolic resin and the friction material including calcined kaolin clay with a tung modified phenolic resin.

Tests have also been conducted that show friction material 52 reaches a static friction coefficient of 0.23 while friction material 50 reaches a static friction coefficient of 0.16. The tests were performed by a performing a 5 second breakaway cycle ramping up to 5 RPMs at a pressure of 1.0 MPa and a temperature of 120° C., as shown in FIG. 3.

Figure 4:
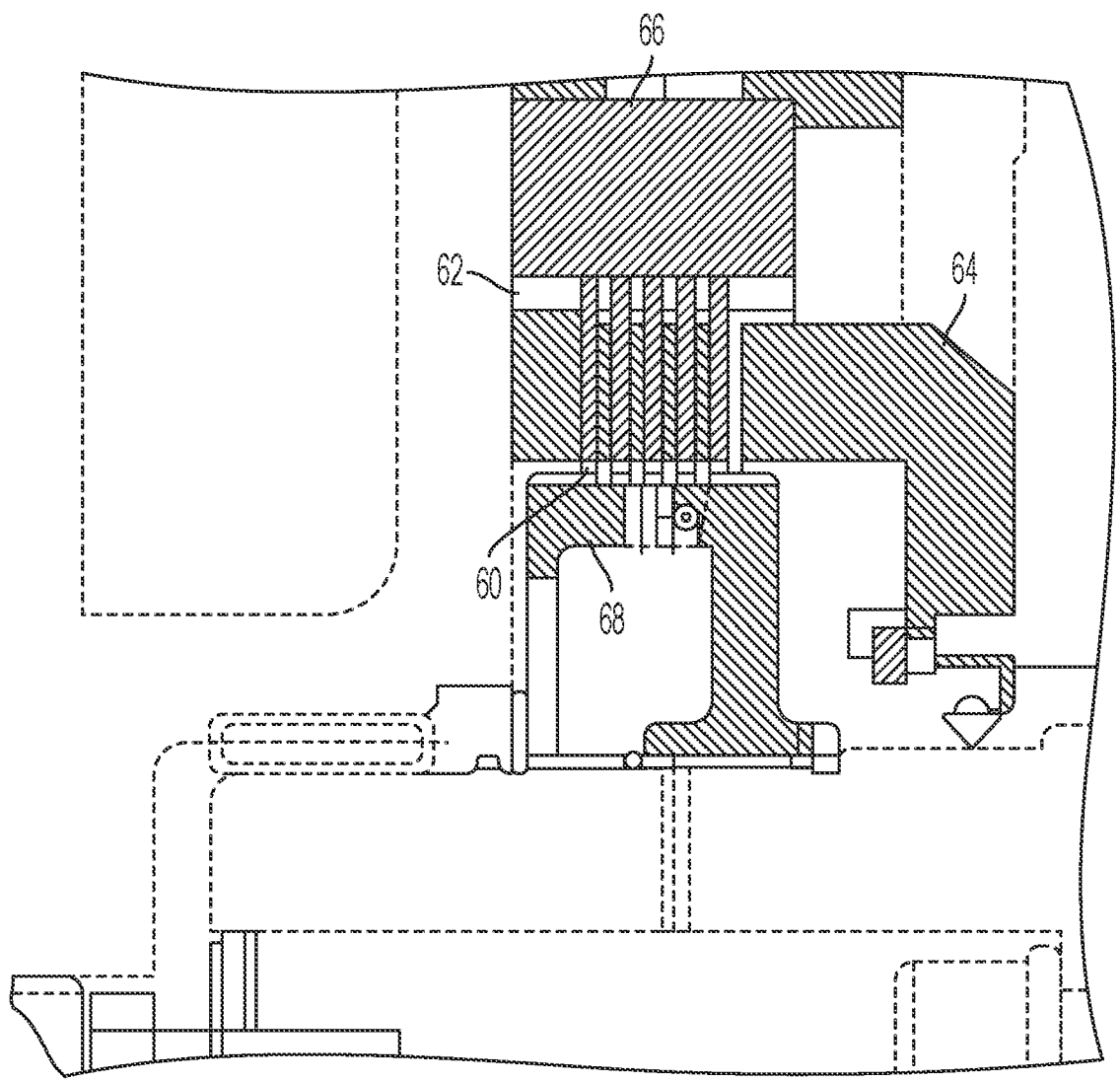
FIG. 4 shows a clutch assembly including a wet friction material layer bonded to clutch plates in a clutch pack.

FIG. 4 shows wet friction material layer 12 bonded to a plurality of clutch plates 60 in a clutch pack 62. A piston 64 forces to clutch plates 60 together to couple parts 66, 68 together such that parts 66, 68 rotate together when the clutch pack 62 is engaged.

In the preceding specification, the disclosure has been described with reference to specific exemplary embodiments and examples thereof. It will, however, be evident that various modifications and changes may be made thereto without departing from the broader spirit and scope of disclosure as set forth in the claims that follow. The specification and drawings are accordingly to be regarded in an illustrative manner rather than a restrictive sense.

LIST OF REFERENCE NUMERALS

12 wet friction material layer
12*a* outer surface
12*b* inner surface
14 metal part
14*a* outer surface
50 friction material with calcined kaolin clay and standard phenolic resin
52 friction material with calcined kaolin clay and tung modified phenolic resin
60 clutch plates
62 clutch pack
64 piston
66, 68 rotating parts

What is claimed is:

1. A clutch assembly for a motor vehicle drivetrain comprising:
    a rigid support; and
    a wet friction material fixed to a surface of the rigid support, the wet friction material comprising:
        a base material including a matrix of fibers and filler particles embedded in the matrix of fibers, the filler particles including calcined kaolin clay, the base material including, by percent weight, 5 to 60% of calcined kaolin clay; and
        a binder embedded in the base material, the binder being tung modified phenolic resin,
        wherein the wet friction material includes, by percent weight, 31 to 35%, of tung modified phenolic resin,
        wherein the wet friction material has a dynamic friction coefficient of 0.17 to 0.24 in automatic transmission fluid having a temperature of 120° C. in a rotational speed range of 5 RPM to 50 RPM and in an applied pressure of 1.0 to 2.5 MPa.

2. The clutch assembly as recited in claim 1 wherein the base material includes, by percent weight, 10 to 40% of calcined kaolin clay.

3. The clutch assembly as recited in claim 1 wherein the base material includes, by percent weight, 15 to 25% of calcined kaolin clay.

4. The clutch assembly as recited in claim 1 wherein the base material includes, by percent weight, 5 to 60% fibers, 1 to 20% graphite by percent weight and 5 to 40% of a further filler material.

5. The clutch assembly as recited in claim 1 wherein the base material includes, by percentage weight, 20-60% fibers, 5-60% calcined kaolin clay, and 5-40% diatomaceous earth.

6. The clutch assembly as recited in claim 1 wherein the base material includes, by percentage weight, 30-60% fibers, 10-40% calcined kaolin clay and 10-40% diatomaceous earth.

7. The clutch assembly as recited in claim 1 wherein the base material includes, by percentage weight, 45-55% fibers, 15-25% calcined kaolin clay and 25-35% diatomaceous earth.

8. The clutch assembly as recited in claim 1 wherein the wet friction material has a dynamic friction coefficient in automatic transmission fluid of at least one of the following:
    0.21 to 0.24 at a fluid temperature of 120° C. in a rotational speed range of 5 RPM to 50 RPM at an applied pressure of 1.0 MPa;
    0.20 to 0.23 at a fluid temperature of 120° C. in a rotational speed range of 5 RPM to 50 RPM at an applied pressure of 1.5 MPa;
    0.19 to 0.21 at a fluid temperature of 120° C. in a rotational speed range of 5 RPM to 50 RPM at an applied pressure of 2.0 MPa; or
    0.17 to 0.19 at a fluid temperature of 120° C. in a rotational speed range between 5 RPM to 50 RPM at an applied pressure of 2.5 MPa.

9. The clutch assembly as recited in claim 1 wherein the wet friction material has a dynamic friction coefficient in automatic transmission fluid of at least one of the following:
    0.17 to 0.21 at a fluid temperature of 120° C. in an applied pressure range of 1.0 MPa to 2.5 MPa at a rotational speed of 5 RPM;
    0.19 to 0.23 at a fluid temperature of 120° C. in an applied pressure range of 1.0 MPa to 2.5 MPa at a rotational speed of 10 RPM;
    0.19 to 0.24 at a fluid temperature of 120° C. in an applied pressure range of 1.0 MPa to 2.5 MPa at a rotational speed of 30 RPM;
    0.19 to 0.24 at a fluid temperature of 120° C. in an applied pressure range of 1.0 MPa to 2.5 MPa at a rotational speed of 40 RPM; or
    0.18 to 0.24 at a fluid temperature of 120° C. in an applied pressure range of 1.0 MPa to 2.5 MPa at a rotational speed of 50 RPM.

10. The clutch assembly as recited in claim 1 wherein the wet friction material has a dynamic friction coefficient of 0.20 to 0.24 in automatic transmission fluid having a temperature of 120° C. in a rotational speed range of 5 RPM to 50 RPM and in an applied pressure of 1.0 to 1.5 MPa.

11. The clutch assembly as recited in claim 1 wherein the wet friction material reaches a static friction coefficient of 0.23 during a 5 second breakaway cycle ramping up to 5 RPMs at a pressure of 1.0 MPa and in automatic transmission fluid having a temperature of 120° C.

12. A method of making the clutch assembly as recited in claim 1, the method comprising:
    fixing the wet friction material to the surface of the rigid support,
    the wet friction material being made by:
        providing the base material including the matrix of fibers and filler particles embedded in the matrix of fibers, the filler particles including calcined kaolin clay;
        saturating the base material with tung modified phenolic resin; and
        curing the tung modified phenolic resin.

13. A wet friction material comprising:
    a base material including a matrix of fibers and filler particles embedded in the matrix of fibers, the filler particles including calcined kaolin clay, the based material including, by percent weight, 5 to 60% of calcined kaolin clay; and a binder embedded in the base material, the binder being tung modified phenolic resin, wherein the wet friction material includes, by percent weight, 31 to 35%, of tung modified phenolic resin, wherein the wet friction material has a dynamic friction coefficient of 0.17 to 0.24 in automatic transmission fluid having a temperature of 120° C. in a rotational speed range of 5 RPM to 50 RPM and in an applied pressure of 1.0 to 2.5 MPa.

* * * * *